June 13, 1933.  S. J. NORDSTROM  1,913,894
LUBRICATED VALVE
Filed Dec. 31, 1929

INVENTOR:
Sven Johan Nordstrom
BY
White, Prost, Fleher & Lothrop
ATTORNEYS.

Patented June 13, 1933

1,913,894

UNITED STATES PATENT OFFICE

SVEN JOHAN NORDSTROM, OF PIEDMONT, CALIFORNIA, ASSIGNOR TO MERCO NORD-STROM VALVE COMPANY, OF SAN FRANCISCO, CALIFORNIA, A CORPORATION OF DELAWARE

LUBRICATED VALVE

Application filed December 31, 1929. Serial No. 417,678.

This invention relates generally to the construction of valves, particularly valves in which a lubricant is applied to a valve working surface. A valve of this character is disclosed in Nordstrom Reissue Patent 14,516 granted August 27, 1918.

It is a general object of this invention to facilitate operation of valves of the above character, whereby lubricant can be forced to the valve working surfaces, in a simpler manner.

It is a further object of this invention to devise a valve of the rotatable plug type, which is constructed in such a manner that an operator can move the valve operating member without turning the plug member, in order to force lubricant to the valve working surfaces and to jack the plug from its seat.

It is a further object of this invention to devise a novel valve particularly adapted for the control of oils or other fluids capable of lubricating the plug member, and which has novel means for diverting and forcing a portion of the fluid from the line, to the valve working surfaces.

Further objects of the invention will appear from the following description in which a preferred embodiment of my invention has been set forth in detail. It is to be understood that the appended claims are to be accorded a range of equivalents consistent with the state of the prior art.

Referring to the drawing.

Figure 2:
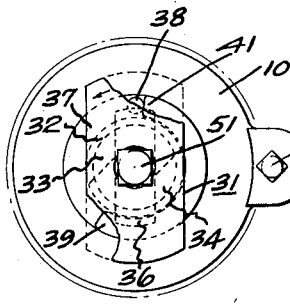
Fig. 2 is a plan view of the valve shown in Fig. 1, a portion of the valve casing being removed, and certain parts being broken away.

The valve as illustrated in the drawing consists of a valve casing or body member 10, having a passageway 11 extending therethrough for flow of fluid. Rotatably disposed within the valve casing, there is a plug member 12, which is preferably tapered. The plug member is disposed within a bore 13 formed within the casing transversely of passageway 11, which bore is also preferably tapered. Thus with the plug member in normal position a sealed area 14 is formed between the casing and plug member, which area is defined by the cooperating valve working surfaces. A hole or port 15 thru plug member 12, is adapted to register with passageway 11, for open position of the valve.

Since plug member 12 is preferably tapered, provision is made for normally urging the plug member into bore 13 and in the direction of its smaller end. As an example of suitable means of this character, a structure is shown similar to that disclosed in Nordstrom Patent 1,671,603. Thus I have provided a flexible metallic diaphragm 16 across the larger end of bore 13, and which is retained in place by means of a removable closure member 17. The peripheral edge portion of diaphragm 16 is shown clamped between closure member 17 and the main body of the valve casing. A hole 18 is formed centrally of closure member 17, and is threaded to receive a plug 19. Positioned within the pocket formed between plug 19 and the diaphragm 16, there is a mass or packing 21 of suitable resilient material, such as asbestos. Positioned centrally of diaphragm 16, there is a thrust member 23, and interposed between the upper end of this thrust member and the adjacent portion of plug member 12, there is a suitable ball 24. Ball 24 is of course alined with the axis of rotation of plug member 12. The force with which the plug member is urged into the casing is determined by the pressure upon packing 21, and can be adjusted by advancing or unscrewing plug 19. Normally the plug is urged into the casing with sufficient force to prevent its being unseated by the pressure of the fluid in the line.

In order to store a certain amount of lubricant, a lubricant chamber 26 is formed within the valve casing 10, preferably at the smaller end of plug member 12. In order to aid in distributing lubricant from this chamber into the valve working surfaces, I have shown a plurality of longitudinal grooves 27 which communicate with a circumferential groove 28. These grooves communicate with chamber 26, and are shown formed in the peripheral surface of plug member 12, in such a manner as to interrupt the valve working surfaces. Circumferential groove 28 can cooperate with a similar circumferential groove 29, formed in the valve casing.

For operating the plug member 13, I have provided a rotatable plug operating member 31, which preferably extends into the casing 10 adjacent one end of the plug member. For a reason which will be presently apparent, member 31 is preferably provided with a threaded engagement 32, with the valve casing, and its inner end extends into the lubricant chamber 26. For connecting plug operating member 31 to the plug 12, I preferably provide lost motion means whereby a certain amount of angular movement of the member 31 is permitted, without rotating plug 12. Thus I have shown members 33 and 34 depending from the lower end of operating member 31, and these portions are normally positioned upon both sides of a non-circular member 36 projecting from the smaller end of the valve plug.

Figure 3:
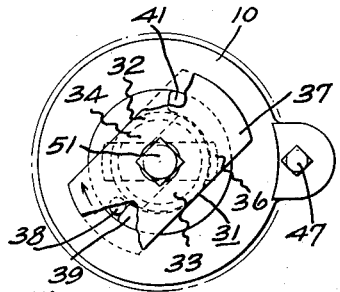
Fig. 3 is a plan view similar to Fig. 2, but illustrating the valve operating member in a different operating position.

If desirable, movement of member 31 can be limited to an angle sufficient to move the plug member from open to closed position, and vice versa. As shown in Figs. 2 and 3, the upper end of member 31 can be provided with an enlarged non-circular portion 37 adapted to receive a wrench or other suitable tool. A pin 38 depends from portion 37 and is adapted to engage the spaced abutments 39 and 41. In a simple valve such as has been illustrated, it is apparent that the plug member should be moved thru an angle of 90° to open and close the same, and because of the lost motion connection between member 31 and the plug, movement of member 31 to secure proper movement of the plug member, must be thru an angle of 90° plus the angular movement permitted by the lost motion connection, of say 45°.

In order to insure a proper supply of lubricant to chamber 26, it is desirable to have a suitable source of lubricant, in communication with chamber 26. When my valve is being utilized for controlling flow of fluids, such as oil, which can be utilized for lubricating the working surface, a certain amount of the oil or other such fluid from the line can be diverted into chamber 26. For example I have shown a port or passage 43 in the valve body which communicates between the inflow side of the valve passageway 11, and the lubricant chamber 26. Flow of fluid thru passage 43 is limited to one direction, by means of a suitable check valve. Such a valve can be formed by balls 44 and 46, provided with suitable seats within passage 43. These balls can be retained in operating position by means of plug 47 threaded into the valve casing.

Figure 1:
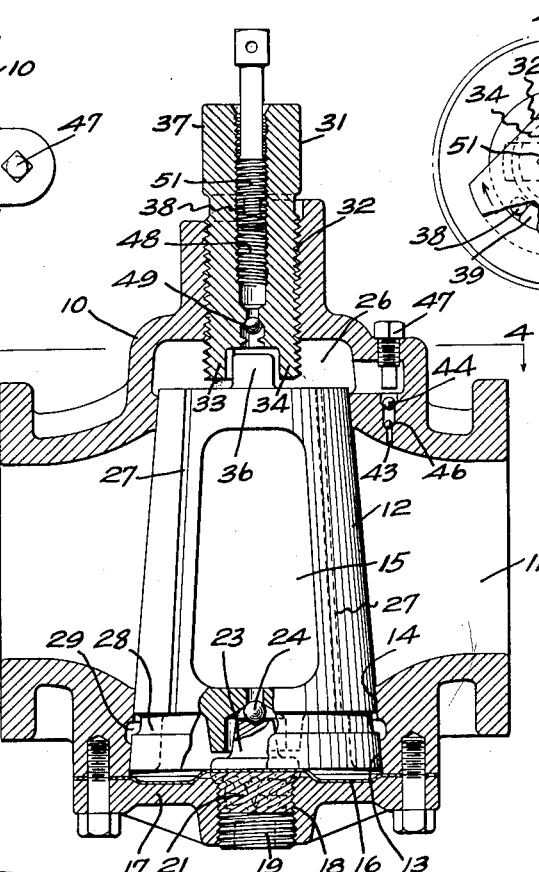
Figure 1 is a side elevational view in cross section, illustrating a valve incorporating my invention.
Figure 5:
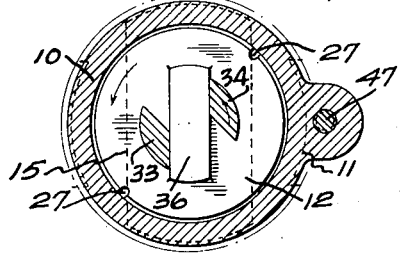
Fig. 5 is a cross sectional view similar to Fig. 4, but with a portion of the casing removed, showing a different operating position for the plug operating member.
Figure 4:
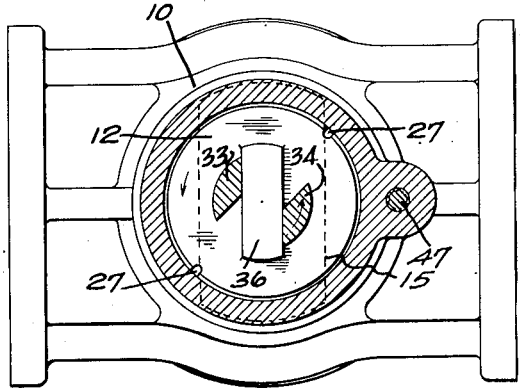
Fig. 4 is a cross sectional view taken along the line 4—4 of Fig. 1.
Figure 6:
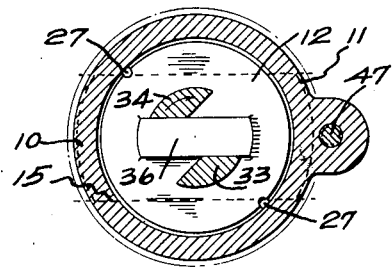
Fig. 6 is a view similar to Fig. 5, illustrating another position for the plug operating member.

The operation of my valve can be explained as follows: Assuming that the valve has been moved to closed position as shown in Figs. 1 and 4, it is apparent that portions 33 and 34 occupy a position relative to portion 36 as shown in Fig. 4. If operating member 31 is now rotated in a counter-clockwise direction, it is apparent that this member will move thru a substantial angle, say 45°, until portions 33 and 34 engage portion 36 as shown in Fig. 5, and during this movement of the operating member 31, the plug member remains stationary. Movement of member 31 thru this angle permitted by the lost motion connection, serves to advance or retract member 31 from the lubricant chamber 26, depending upon the direction of rotation and upon whether the threads of engagement 32 are left or right handed. When rotated so as to advance member 31 into chamber 26, the volumetric capacity of this chamber is substantially decreased, thus forcing lubricant under pressure thru grooves 27 and 28 to the valve working surfaces, and forcing downwardly upon the smaller end of the plug with sufficient pressure to unseat the plug with respect to the casing. Thus if the plug member has become fast in closed position, it can be broken or jacked away from its seat, merely by angular movement of operating member 31, thru the angle permitted by the lost motion connection. If a single movement of member 31, sufficient to bring portions 33 and 34 from the position shown in Fig. 4 to that shown in Fig. 5, is not sufficient to effect adequate lubrication of the working surfaces, or to effect longitudinal jacking movement of the plug member, member 31 can be oscillated a number of times, while the plug member remains stationary. Such oscillating movement serves in effect to pump lubricant from the line into the lubricant chamber 26 thru the passage 43. When operating member 31 is turned beyond the position indicated by Fig. 5, to the position indicated by Fig. 6, it carries with it the rotatable plug member, and opening 15 is brought in registry with the passageway 11. In this open position of the valve, as well as the closed position, or in any intermediate position, it is possible to apply pressure to the lubricant in chamber 26 by one or more movements of the valve operating member, thus supplying lubricant to the valve working surfaces, and effecting longitudinal jacking movement of the plug member if sufficient pressure is applied.

As has been previously mentioned, the particular valve illustrated in the drawing has been designed for use with fluids having lubricating properties. In such valves it is frequently desirable to have auxiliary lubricating means. Thus I have shown a threaded bore 48 extending down thru operating member 31, and this bore is in communication with chamber 26 thru a check valve 49. Lubricant introduced into bore 48, can be compressed by a manual screw 51.

It is apparent that the valve herein disclosed is relatively simple as to construction and operation. One novel characteristic of the preferred embodiment is that a single operating member (head 31) serves to effect turning of the plug, drawing of lubricant into the lubricant chamber when the operating member is turned in one direction, and to compress the lubricant when the operating member is turned in the other direction to enable applying the lubricant to the valve working surfaces and to enable longitudinal jacking movement of the plug. It is also apparent that the novel arrangement and cooperation of parts of the valve, including the threaded connection 32, affords means responsive to movements of the head 31 or operating member for forcing lubricant to the valve working surfaces, without effecting substantial turning movement of the plug or valve member.

I claim:

1. In a valve, a valve casing having a passageway therethrough for flow of fluid, a valve member disposed in said casing and movable for controlling flow of fluid through said passageway, a lubricant chamber formed in said casing at one end of said valve member, a valve operating member extending into said chamber, means forming a lost motion connection between one end of said valve member and said operating member, said means permitting substantial angular oscillation of said operating member relative to said valve member and means associated with said lubricant chamber, whereby pressure may be increased therein by successive oscillations of said valve operating member.

2. In a valve, a valve casing having a passageway therethrough for flow of fluid, a valve member disposed in said casing and movable for controlling flow of fluid through said passageway, said casing and said valve member having valve working surfaces formed therebetween, a lubricant chamber formed in said casing at one end of said valve member, a valve operating member extending into said chamber, means forming a lost motion connection between one end of said valve member and said operating member, said means permitting substantial angular oscillation of said operating member relative to said valve member and a one way valve means associated with said lubricant chamber and connected to a source of lubricant whereby pressure may be increased therein by successive oscillations of said valve operating member to force lubricant to said working surfaces.

3. In a valve, a valve casing having a passageway therethrough for flowing of fluid, a valve member disposed in said casing and movable for controlling flow of fluid through said passageway, said casing and valve member having valve working surfaces formed therebetween, a lubricant chamber formed in said casing at one end of said valve member, a valve operating member extending into said chamber, means forming a lost motion connection between one end of said valve member and said operating member, said means permitting substantial oscillation of said operating member relative to said valve member and a check valve associated with said lubricant chamber and connected to said passageway whereby pressure may be increased in said chamber by successive oscillations of said valve operating member to force lubricant to said working surfaces and to force said valve member from its seat.

4. A valve comprising a casing having a passageway therethrough for flow of fluid and a tapered bore or seat formed transversely of the passageway, a tapered plug rotatably disposed in the bore and having a hole adapted to register with the passageway, a lubricant chamber formed in the casing at the smaller end of the plug, resilient means for forcing the plug in the direction of its smaller end, a rotatable plug operating head threaded into the casing and having its inner end disposed within the chamber, said head being detached from the plug, there being a lost motion connection between the head and plug for turning the plug, said lost motion connection permitting the head to be oscillated without turning the plug, a check valve control passage between the lubricant chamber and the passageway thru the casing, rotation of the head in one direction serving to draw fluid from the passageway into the chamber, and rotation of the head in the opposite direction serving to compress the fluid in the chamber to unseat the plug.

In testimony whereof, I have hereunto set my hand.

SVEN JOHAN NORDSTROM.